US007848558B2

(12) United States Patent
Giger et al.

(10) Patent No.: US 7,848,558 B2
(45) Date of Patent: Dec. 7, 2010

(54) METHOD AND SYSTEM FOR FRACTAL-BASED ANALYSIS OF MEDICAL IMAGE TEXTURE

(75) Inventors: Maryellen L. Giger, Elmhurst, IL (US); Hui Li, Chicago, IL (US)

(73) Assignee: The University of Chicago, Chicago, IL (US)

( * ) Notice: Subject to any disclaimer, the term of this patent is extended or adjusted under 35 U.S.C. 154(b) by 1319 days.

(21) Appl. No.: 10/777,041

(22) Filed: Feb. 13, 2004

(65) Prior Publication Data

US 2004/0258310 A1    Dec. 23, 2004

Related U.S. Application Data

(60) Provisional application No. 60/447,295, filed on Feb. 14, 2003.

(51) Int. Cl.
    *G06K 9/00* (2006.01)
(52) U.S. Cl. .................. 382/132; 382/155; 382/129
(58) Field of Classification Search .......... 382/132, 382/155, 165, 141, 129, 128
    See application file for complete search history.

(56) References Cited

U.S. PATENT DOCUMENTS

| | | | | |
|---|---|---|---|---|
| 5,444,795 A | * | 8/1995 | Tzoganakis | 382/141 |
| 5,671,294 A | * | 9/1997 | Rogers et al. | 382/228 |
| 5,732,158 A | * | 3/1998 | Jaenisch | 382/249 |
| 6,282,305 B1 | * | 8/2001 | Huo et al. | 382/128 |
| 7,123,762 B2 | * | 10/2006 | Giger et al. | 382/132 |
| 2002/0025063 A1 | * | 2/2002 | Jiang et al. | 382/132 |
| 2002/0122587 A1 | * | 9/2002 | Lim et al. | 382/165 |
| 2002/0196966 A1 | * | 12/2002 | Jiang et al. | 382/132 |
| 2003/0174873 A1 | * | 9/2003 | Giger et al. | 382/128 |

OTHER PUBLICATIONS

Quantitative Classification of Mammographic Densities and Breast Cancer Risk: Results From the Canadian National Breast Screening Study, Journal of the National Cancer Institute, vol. 87, No. 9, May 1995, pp. 670-675.
Automated analysis of mammographic densities, Phys. Med. Biol. 41 (1996) pp. 909-923.
Automated Analysis of Mammographic Densities and Breast Carcinoma Risk, Mammographic Density: Breast Carcinoma Risk/Byng et al., Cancer Jul. 1, 1997/ vol. 80, No. 1, pp. 66-74.

(Continued)

*Primary Examiner*—Daniel G Mariam
*Assistant Examiner*—Aklilu k Woldemariam
(74) *Attorney, Agent, or Firm*—Oblon, Spivak, McClelland, Maier & Neustadt, L.L.P.

(57) ABSTRACT

A computerized method, system and computer program for the computerized fractal-based analysis of a structure as presented in a pattern on a medical image. Image data is generated from the medical image and a region of interest is selected. The image data is digitized and analyzed to reveal fractal-based computer-generated features of a texture of the image data. Then a qualifier is applied to the computer-generated features to obtain fractal characteristics of the image data. A multi-fractal nature is observed for the texture of the region of interest. A marker for assessing a risk of a disease is yielded based on the multi-fractal nature of the texture.

18 Claims, 5 Drawing Sheets

Selected ROI
256 by 256 pixels

OTHER PUBLICATIONS

Characterisation of mammographic parenchymal pattern by fractal dimension, Phys. Med. Biol., 1990, vol. 35, No. 2, 235-247.
Characterization of bone quality using computer-extracted radiographic features, Med. Phys. vol. 26, No. 6, Jun. 1999, pp. 872-879.

U.S. Appl. No. 10/360,814, filed Feb. 10, 2003, Giger et al.
U.S. Appl. No. 10/617,675, filed Jul. 14, 2003, Giger et al.
U.S. Appl. No. 10/724,395, filed Dec. 1, 2003, Giger et al.
U.S. Appl. No. 10/793,799, filed Mar. 8, 2004, Giger et al.

* cited by examiner

Selected ROI
256 by 256 pixels

METHOD AND SYSTEM FOR FRACTAL-BASED ANALYSIS OF MEDICAL IMAGE TEXTURE

BACKGROUND OF THE INVENTION

Field of the Invention

The present invention relates to a method, system and computer program for computerized assessment of breast cancer risk using fractal-based texture analysis.

The present invention also generally relates to automated techniques for the detection of abnormal anatomic regions, for example, as disclosed, in particular, in one or more of U.S. Pat. Nos. 4,907,156; 5,133,020; 5,832,103; and 6,138,045; all of which are incorporated herein by reference.

The present invention also generally relates to computerized techniques for automated analysis of digital images, for example, as disclosed in one or more of U.S. Pat. Nos. 4,839,807; 4,841,555; 4,851,984; 4,875,165; 4,918,534; 5,072,384; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,732,697; 5,740,268; 5,790,690; 5,873,824; 5,881,124; 5,931,780; 5,974,165; 5,982,915; 5,984,870; 5,987,345; 6,011,862; 6,058,322; 6,067,373; 6,075,878; 6,078,680; 6,088,473; 6,112,112; 6,141,437; 6,185,320; 6,205,348; 6,240,201; 6,282,305; 6,282,307; 6,317,617 as well as U.S. patent application Ser. Nos. 08/173,935; 08/398,307 (PCT Publication WO 96/27846); Ser. Nos. 08/536,149; 08/900,189; 09/027,468; 09/141,535; 09/471,088; 09/692,218; 09/716,335; 09/759,333; 09/760,854; 09/773,636; 09/816,217; 09/830,562; 09/818,831; 09/842,860; 09/860,574; 60/160,790; 60/176,304; 60/329,322; 09/990,311; 09/990,310; 09/990,377; and 60/331, 995; and PCT patent applications PCT/US98/15165; PCT/US98/24933; PCT/US99/03287; PCT/US00/41299; PCT/US01/00680; PCT/US01/01478 and PCT/US01/01479, all of which are incorporated herein by reference.

The present invention includes the use of various technologies referenced and described in the above-noted U.S. patents, as well as described in the references identified in the following LIST OF REFERENCES by the author(s) and year of publication and cross-referenced throughout the specification by reference to the respective number in parentheses, of the reference:

LIST OF REFERENCES

1. American Cancer Society. Cancer Facts and Figures-2002. p. 9, 2002.
2. Carter C L, Allen C, and Henson D E, "Relation of tumor size, lymph node status, and survival in 24,740 breast cancer cases," *Cancer* 63, pp. 181-189, 1989.
3. Clay M G, Hishop G, Kan L, Olivotto I A, and Burhenne L J W, "Screening mammography in British Columbia 1988-1993," *Am. J Surg.* 167, pp. 490-492, 1994.
4. Smith R A, "Screening women aged 40-49: where are we today?" *JNCI* 87, pp. 1198-1200, 1995.
5. Maragos P, "Fractal signal analysis using mathematical morphology," *Adv. Electron. Electron Phys.* 88, pp. 199-246, 1994.
6. Jiang C, Giger N L, Chinander M R, Martell J M, Kwak S, and Favus M J, "Characterization of bone quality using computer-extracted radiographic features," *Med. Phys.* 26, pp. 872-879, 1999.
7. Esgiar A N, Naguib R N, Sharif B S, and Bennett M K, "Fractal analysis in the detection of colonic cancer images," *IEEE Trans. Info. Tech. Biomed.* 6, pp. 54-58, 2002.
8. Caldwell C B, Stapleton S J, Holdsworth D W, Jong R A, Weiser W J, Cooke G, and Yaffe M J, "Characterization of mammographic parenchymal pattern by fractal dimension," *Phys. Med. Biol.* 35, pp. 235-247, 1990.
9. American Cancer Society. Cancer facts and Figures-1998. New York, N.Y. 1998; p. 20.
10. King M-C. Breast cancer genes: how many, where, and who are they? Nature Genet 1992; 2:250-290.
11. Offit K and Brown K. Quantitation of familial cancer risk: a resource for clinical oncologists. J Clin Oncol 1994; 86:620-625.
12. King M-C, Rowell S and Love S M. Inherited breast and ovarian cancer. JAMA 1993; 269:1975-1980.
13. Hall J M, Lee M K and Morrow J. Linkage of early-onset familial breast cancer to chromosome 17q21. Science 1990; 250:1684-1689.
14. Malkin D, Li F P and Strong L C. Germ line p53 mutations in a familial syndrome of breast cancer, sarcomas, and other neoplasms. Science 1990; 250:1233-1238.
15. Offit K. Clinical Cancer Genetics: Risk Counseling and Management. New York, Wiley-Liss, 1998.
16. Struewing J P, Hartge P, Wacholder S, Baker S M, Berlin M, McAdams M, Timmerman M M, Brody L C and Tucher M A. The risk of cancer associated with specific mutations of BRCA1 and BRCA2 among ashkenazi jews. N Engl J Med 1997; 336:1401-1408.
17. Easton D F, Ford D and Bishop T D. Breast and ovarian cancer incidence in BRCA1-mutation carriers. Am J Hum Genet 1995; 56:256-271.
18. Newman B, Austin M A, Lee M and King M-C. Inheritance of human breast cancer: evidence for autosomal dominant transmission in high risk families. Proc Natl Acad Sci USA 1988; 85:3044-3048.
19. Claus E B, Risch N and Thompson W D. Genetic analysis of breast cancer in the cancer and steroid hormone study. Am J Hum Genet 1991; 48:232-242.
20. Clark-Paul K C, Thomas R S and Ketcham A S. Estrogen and the breast. Surg Oncol Clin North 1993; 2:135-144.
21. Miller B A. The epidemiology of breast cancer In Ames F C, Blumenschein G R and Montague E D (eds): Current Controversies in Breast Cancer. Austin, Tex. The University of Texas Press, 1984.
22. Gail M H and Benichou J. Assessing the risk of breast cancer in individuals. In DeVita V T, Hellman S and Rosenberg S A (eds): Cancer Prevention. Philadelphia. J.B. Lippincott, 1992; 1-15.
23. Kosary C L, Ries L A G, Miller B A, Harris A and Edwards B K. SEER cancer statistics review, 1973-1992: tables and graphs. Bethesda, Md., National Cancer Institute, 1995.
24. Claus E B, Risch N and Thompson W D. Autosomal dominant inheritance of early-onset breast cancer: Implications for risk prediction. Cancer 1993; 73:643-651.
25. Boyd N F, Byng J and Jong R. Quantitative classification of mammographic densities and breast cancer risk: results from the Canadian National Breast Screening Study. J Natl Cancer Inst 1995; 87:670-675.
26. Boyd N F, O'Sullivan B, Campbell J E, Fishell E, Simor I and Cooke G. Mammographic signs as risk factors for breast cancer. Br J Cancer 1982; 45:185-193.
27. Wolfe J N, Saftlas A F and Salane M. Mammographic parenchymal patterns and quantitative evaluation of mammographic densities: a case-control study. Am J Roentgenol 1987; 148:1087-1092.

28. Brisson J, Morrison A S and Khalid N. Mammographic parenchymal features and breast cancer in the Breast Cancer Detection Demonstration Project. J Natl Cancer Inst 1980; 80:1534-1540.
29. Saftlas A F, Hoover R N, Brinton L A, Szklo M, Olson D R, Salane M and Wolfe J N. Mammographic densities and risk of breast cancer. Cancer 1991; 67:2833-2838.
30. Byrne C, Schairer C, Wolfe J, Parekh N, Salane M, Brinton L A, Hoover R and Haile R. Mammographic features and breast cancer risk: effects with time, age, and menopause status. J Natl Cancer Inst 1995; 87:1622-1629.
31. Gail M H, Brinton L A, Byar D P, Corle D K, Green S B, Schairer C and Mulvihill J J. Projecting individualized probabilities of developing breast cancer of white females who are being examined annually. J Natl Cancer Inst 1989; 81:1879-1886.
32. Bondy M L, Lustbader E D, Halabi S, Ross E and Vogel V G. Validation of a breast cancer risk assessment model in women with a positive family history. L Natl Cancer Inst 1994; 86:620-625.
33. Spiegelman D, Colditz G A, Hunter D and Hertzmark E. Validation of the Gail et al. model for predicting individual breast cancer risk. J Natl Cancer Inst 1989; 86:600-607.
34. Hoskins K F, Stopfer J E and Calzone K A. Assessment and counseling for women with a family history of breast cancer. JAMA 1995; 273:577-586.
35. Biesecker B B, Boehnke M, Calzone K, Markel D S, Garber J E, Collins F S and Weber B L. Genetic counseling for families with inherited susceptibility to breast and ovarian cancer. JAMA 1993; 269:19701974.
36. Gail M H and Benichou J. Epidemiology and biostatistics program of the national cancer institute. J Natl Cancer Inst 1994; 86:573-575.
37. Wolfe J. Breast patterns as an index of risk for developing breast cancer. Am J Roentgenol 1976; 126:1130-1139.
38. Warner E, Lockwood G, Math M, Tritchler D and Boyd N F. The risk of breast cancer associated with mammographic parenchymal patterns: a meta-analysis of the published literature to examine the effect of method of classification. Cancer Detection and Prevention 1992; 16:67-72.
39. Egan R L and Mosteller R C. Breast cancer mammography patterns. Cancer 1997; 40:2087-2090.
40. Boyd N F, O'Sullivan B and Fishell E. Mammographic patterns and breast cancer risk: methodological standards and contradictory results. J Natl Cancer Inst 1984; 72:1253-1259.
41. Oza A M and Boyd N F. Mammographic parenchymal patterns: a marker of breast cancer risk. Epidemiologic Rev 1993; 15:196-208.
42. Ma L, Fishell E and Wright B. Case-control study of factors associated with failure to detect breast cancer by mammography. J Natl Cancer Inst 1992; 84:781-785.
43. Whitehead J, Calile T and Kopecky K J. Wolfe mammographic parenchymal patterns: a study of the masking hypothesis of Egan and Mosteller. Cancer 1985; 56:1280-1286.
44. Boyd N F, O'Sullivan B O, Fishell E, Simor I and Cooke G. Mammographic patterns and breast cancer risk: methodological standards and contradictory results. J Natl Cancer Ints 1984; 72:1253-1259.
45. Magnin I E, Cluzeau F and Odet C L. Mammographic texture analysis: an evaluation of risk for developing breast cancer. Optical Engineering 1986; 25:780-784.
46. Caldwell C B, Stapleton S J, Holdsworth D W, Jong R A, Weiser W J, Cooke C and Yaffe M J. Characterization of mammographic parenchymal pattern by fractal dimension. Phys Med Biol 1990; 35:235-247.
47. Taylor P, Hajnal S, Dilhuydy M-H and Barreau B. Measuring image texture to separate "difficult" from "easy" mammograms. British J Rad 1994; 67:456-463.
48. Tahoces P, Correa J, Souto M, Gomes L and Vidal J. Computer-assisted diagnosis: The classification of mammographic breast parenchymal patterns. Phys Med Biol 1995; 40:103-117.
49. Byng J W, Yaffe M J, Lockwood G A, Little L E, Tritchler D L and Boyed N F. Automated analysis of mammographic densities and breast carcinoma risk. Cancer 1997; 88:66-74.
50. Byng J W, Boyd N F, Fishell E, Jong R and Yaffe M J. Automated analysis of mammographic densities. Phys Med Biol 1996; 1996:909-923.
51. Byng J, Boyd N, Fishell E, Jong R and Yaffe M. Automated analysis of mammographic densities. Phys Med Biol 1996; 1996:909-923.
52. Z. Huo, M. L. Giger, O. I. Olopade, D. E. Wolverton, B. L. Weber, C. E. Metz, W. Zhong, and S. A. Cummings, "Computerized analysis of digitized mammograms of BRCA1 and BRCA2 gene mutation carriers," *Radiology* 225, pp. 519-526, 2002.
53. H. Li, M. Giger, Z. Huo, L. Lan, I. Bonta and O. I. Olopade, "Computerized analysis of mammographic patterns for assessing breast cancer risk: effect of ROI size and location," manuscript in preparation.
54. C. E. Metz, "ROC methodology in radiologic imaging," *Invest. Radiol.* 21, pp. 720-733, 1986.
55. P. A. Lachenbruch and M. R. Mickey, "Estimation of error rates in discriminant analysis," *Technometrics* 10, pp. 1-11, 1968.
56. Y. Jiang, C. E. Metz, and R. M. Nishikawa, "A receiver operating characteristics partial area index for highly sensitive diagnostic tests," *Radiology* 201, pp. 745-750, 1996.

DISCUSSION OF THE BACKGROUND

Breast cancer risk assessment provides an opportunity to devise appropriate surveillance plans that may include enhanced screening for women at increased risk of breast cancer. Computerized analysis of mammographic parenchymal patterns provide an objective and quantitative characterization and classification of these patterns, which may be associated with breast cancer risk. Computerized assessment of breast cancer risk based on the analysis of mammograms alone or combined with epidemiologic risk factors (for example, age) may serve as an alternative to current existing clinical methods, which are costly and/or information-dependent, in predicting breast cancer risk.

Breast cancer is the most frequently diagnosed cancer and is the second leading cause of death in women with an estimate that 203,500 new invasive cases will be diagnosed as malignant and 39,600 women will die from breast cancer in the United States in 2002 [1]. Studies show that mammography is the most effective imaging technique for the early detection of breast cancer [2, 3], which has potential to reduce the breast cancer mortality by as much as 30% [4]. Annual mammography has been recommended for women age 40 and older by American Cancer Society [1]. There is a need to develop new strategies, methods and systems for identifying breasts that are at risk of invasive breast cancer at the earliest stage in the multi-step carcinogenesis process.

Pattern recognition based on the concept of traditional fractal dimension has been applied in many complex systems. Many physical systems in nature are suitable to be described by fractal dimensions to show both self similarity and the overall roughness at multiple scales [5]. Several studies reported that fractal dimension has been useful in characterizing complex biological systems which are similar to mammographic patterns [6-8]. All these suggest that fractal based computerized radiographic markers may be a useful descriptor to characterize mammographic parenchymal patterns.

The breast is composed primarily of two components, fibroglandular tissue and fatty tissue. The average breast consists of 50% fibroglandular tissue and 50% fat. Fibroglandular tissue is a mixture of fibrous connective tissue and the glandular epithelial cells that line the ducts of the breast (the parenchyma). The major breast diseases develop from the terminal ductal lobular units of the breast, and arise predominantly from the epithelial cells that line the ducts; however, the fibrous or connective tissue can also be involved. It is thought by most experts that malignant breast disease develops through a process that starts with epithelial hyperplasia, i.e., an increase in the number of epithelial cells. Epithelial hyperplasia can progress to atypical hyperplasia in which the epithelial cells not only increase in number, but also change in a way that is not normal for these cells. The process, at this stage, is believed to be reversible. Once a certain criterion level of atypia is reached, the diagnosis of carcinoma-in-situ can be made, in which there is no invasion of malignant cells outside of the duct. The process of malignant transformation is considered irreversible at this stage. In the last phase of development, the cancer cells break out of the ductal walls and invade the surrounding stromal tissue, and at this point the disease is called infiltrating or invasive carcinoma. Most (80%-85%) breast carcinomas can be seen on a mammogram as a mass, a cluster of tiny calcifications, or a combination of both. Other mammographic abnormalities are of lesser specificity and prevalence than masses and/or calcifications, and include skin or nipple changes, abnormalities in the axilla, asymmetric density, and architectural distortion.

Early detection of breast cancer can improve survival rates. The overall five-year survival rate for women diagnosed with breast cancer is 84%, but when found at a small, localized stage, the 5-year survival rate is 97% [9]. Studies show that use of screening mammography can reduce lesion size and stage at detection, improving the prognosis for survival. Currently, mammography is a well-established imaging technique for early detection of breast cancer. Annual screening mammography is recommended by the American Cancer Society for all women over the age of 40 [9].

Clinical acquisition of x-ray mammograms is a rather complicated procedure and requires specific techniques in order to obtain high quality images. Attenuation differences between various structures within the breast contribute to image contrast. Due to the similar composition of breast structures and the physical manifestations of breast carcinoma, screen-film mammographic imaging must be substantially different from general radiographic imaging. Low-energy x-rays are required to enhance the ability to differentiate between normal tissues and carcinoma. The radiological appearance of the breast varies between individuals because of variations in the relative amounts of fatty and fibroglandular tissue. Since fat has a lower effective atomic number than that of fibroglandular tissue, there is less x-ray attenuation in fatty tissue than in fibroglandular tissue. Fat appears dark (i.e., higher optical density) on a mammogram, while fibroglandular tissue appears light (i.e., lower optical density) on a mammogram. Regions of brightness associated with fibroglandular tissue are normally referred to as "mammographic density."

Screening mammography typically includes two standard radiographic projections, medio-lateral oblique (MLO) and cranio-caudal (CC), that are taken of each breast (right and left) for a total of four images. The purpose of these two views is to completely image the breasts and, if any lesions are present, allow localization and preliminary characterization.

As the best method for early detection of breast cancer, annual screening mammography has been recommended for women over 40 years of age [9]. Mammographic surveillance for women under age 40 years who are at very high risk of developing breast cancer, however, still remains an issue, since the benefit of screening women in this age group has not been proven. Women at high risk of developing breast cancer tend to develop breast cancer at a younger age [10]. Identification and close follow-up of these high-risk women may provide an opportunity for early breast cancer detection. Thus, computerized methods that are capable of assessing breast cancer risk may allow women and their physicians to devise an individualized surveillance plan that may include enhanced screening for women at high risk for early detection of breast cancer. These plans may lead to improvements in the overall efficacy of screening mammography for early detection of breast cancer. Further, knowledge of which women are at high risk of developing breast cancer has important implications in the study of breast cancer.

There are two widely used methods to measure risk: relative risk and absolute risk [11]. Relative risk is defined as the ratio of age-specific breast cancer incidence rate among women with specific risk factors to the incidence rate among women without known risk factors. Relative risk estimates are useful for measuring the relative magnitude of effect of a given risk factor as a population risk. However, relative risk estimates do not directly approximate the underlying probability of a diagnosis of breast cancer for an individual over time.

Absolute risk (or cumulative risk) is defined as the probability that a woman with given risk factors and given age will develop breast cancer over a defined time period. Absolute risk estimates give women a realistic and individualized estimate of the chance of developing cancer over various time horizons. An assessment of cumulative risk over different periods of time can help a woman understand the extent of her risk and therefore, can be useful in helping the woman and her doctor define an acceptable surveillance plan for the future.

For decades, it has been known that all breast cancers are genetic, i.e., the development of breast cancer is the result of alteration of chromosomal DNA through mutation or damage with the resultant loss of normal growth regulation [12]. Sporadic breast cancer results from somatic changes that are specific to the tumor cells, i.e., the epithelial cells of the breast, which are not found in other cells of the patient. Recent molecular studies demonstrate that breast cancer may be inherited [10, 13, 14]. Using genetic linkage analysis to identify a gene named BRCA1 (breast cancer 1), was found to be responsible for the breast cancer diagnosed in women who inherited a mutated form of the BRCA1 gene in all cells (germline mutation) at birth. Since then, four other genes responsible for breast cancer, including the BRCA2 (breast cancer 2) gene, have been identified [15]. In general, hereditary breast cancer appears earlier than purely sporadic breast cancer, because among women with inherited susceptibility, one of the cancer-causing mutations is present from birth. Thus, fewer somatic mutations specific to breast cancer cells need to occur.

It is estimated that women who inherit a mutated form of the BRCA1 gene have as much as a 20% risk of developing breast cancer by age 40 years, a 33%-73% risk of developing breast cancer by age 50 years, and an 56%-87% risk of developing breast cancer by age 70 years [16, 17] which is about up to 8 times higher than the lifetime risk for the general population. The recent isolation of BRCA1 and BRCA2, and the acknowledgment that additional breast cancer susceptibility genes may exist, provides a molecular basis for counseling some high-risk women.

Although the evidence of familial aggregation of breast cancer suggests that there is an important hereditary component, there are many families in which breast cancer (familial breast cancer) has appeared more than once purely by chance and not as the result of inherited susceptibility. Studies show that truly hereditary breast cancers accounts only for 5%-10% of all breast cancers [18, 19], and most breast cancers occur sporadically and are likely the result of random events on the cellular level. In addition to age, many factors have been identified to be related to breast cancer risk. Although, the basic mechanism underlying the association between breast cancer and these risk factors is not well understood. It has been recognized for some time that varying levels of endogenous and exogenous estrogens have been associated with the risk of developing breast cancer. Higher levels of endogenous hormones, in particular estrogens, are an important factor in the etiology of breast cancer [20, 21].

TABLE 1

Selected factors for breast cancer risk.

| Factor | Comparison group | Approximate relative risk |
|---|---|---|
| Age | | |
| 40-44 | Age 25-29 | 16 |
| 50-54 | | 28 |
| 60-64 | | 44 |
| 70-74 | | 56 |
| Western country | Japan | 5 |
| Family history of breast cancer | | |
| One affected first-degree relative | No affected first-degree relative | 1.4-3 |
| Two or more affected first-degree relatives | | 4-6 |
| Early age (30 yrs old) of onset in affected relative | Age 50 | 2.6 |
| Reproductive history | | |
| Age at menarche, 11 | Age 16 | 1.3 |
| Age at first live birth | | |
| 20-247 | <20 | 1.3 |
| 25-29 | | 1.6 |
| ≧30, nulliparous | | 1.9 |
| Age at menopause | | |
| After 55 | Age 45-55 | 1.5 |
| Before 45 | | 0.7 |
| Evidence of breast pathology | | |
| Any benign disease | No biopsy or aspiration | 1.5 |
| Proliferative disease | | 2 |
| Atypical hyperplasia | | 2-4 |
| History of cancer in contralateral breast | No history of cancer | 5 |
| Percent dense parenchyma on mammography | | |
| 5%-24.9% | <5% dense regions | 1.7 |
| 25%-44.9% | | 2.5 |
| 45%-64.9% | | 3.8 |
| >65% | | 4.3 |

TABLE 1-continued

Selected factors for breast cancer risk.

| Factor | Comparison group | Approximate relative risk |
|---|---|---|
| Exposures | | |
| Radiation, 100 rads | No special exposure | 3 |
| Alcohol, two drinks/day | Non drinker | 1.7 |

From Gail MH, Benichou J. Assessing the risk of breast cancer in individuals.
In deVita VT, Helman S, Rosenberg SA (eds): Cancer Prevention, Philadelphia, JB Lippincott; 1992, pp 1-15.

Risk factors for breast cancer can be classified broadly as being of either personal or environmental origin. Personal risk includes aspects of individual biological histories, such as family history of breast cancer, reproductive history, menopausal status, and breast disease history. Environmental risk factors are exogenous influences, such as diet and exposure to environmental carcinogens. Table 1 lists selected factors that have a strong or well-established association with breast cancer. These factors were identified on the basis of large epidemiologic studies [22].

Among these risk factors, age has been identified as the single most important risk factor for the development of breast cancer in women. The incidence of breast cancer increases with age. Studies show that diagnosis of breast cancer is rare before age 25 years [23]. The incidence of breast cancer increases rapidly between the ages of 25 and 44. Near the age of menopause, the rate of increase in incidence for successive age groups is slower compared with the observations in premenopausal women. In addition to age, risk factors such as family history of breast cancer, personal history of breast cancer, biopsy-confirmed benign proliferative breast disease, and age at first live birth and at menarche have been identified and have been used in clinical risk prediction models [11, 22, 24] to estimate an individual's risk of developing breast cancer.

Increased mammographic density is another factor that has been found to be associated with an increased risk of breast cancer. It has been shown in several studies that women with increased mammographic parenchymal density are at a four- to six-fold higher risk over women with primarily fatty breasts [25-30]. At present, the reason for this increased risk is unclear. One possibility is that increased density reflects a larger amount of tissue at risk for developing breast cancer. Since most breast cancers develop from the epithelial cells that line the ducts of the breast, having more of this tissue as reflected by increased mammographic density may increase the chances of developing breast cancer.

The Gail and Claus models are used to estimate individual risk over a woman's lifetime (up to 79 years old) and during the next 10 years of her lifetime, which are referred to as the lifetime risk and the 10-year risk of developing breast cancer.

The Gail model [31] was developed based on case-control studies involving 2,852 white women with incident breast cancer and 3,146 white controls selected from the Breast Cancer Detection Demonstration Project (BCDDP) population data. The risk factors used in the Gail model are age, age at menarche, age at first live birth, number of previous breast biopsies, number of first-degree relatives with breast cancer and history of biopsy with hyperplasia [22, 31]. These risk factors are broadly consistent with those selected from other large population-based studies [22]. Because the Gail model was developed from a database which includes only white women who tend to return for annual mammographic screening [22], it is anticipated that this model would overpredict risk in younger, unscreened women since the BCDDP population had a higher prevalence of women with adverse risk factors than the general population [22, 31].

The Claus model [24] was derived from the Cancer and Steroid Hormone (CASH) Study, which was a multicenter, population-based, case-control study. The data consists of 4730 patients with histologically confirmed breast cancer, age 20-54 years, and 4688 control subjects. The control subjects were frequency-matched to patients according to geographic region and 5-year categories of age. The aim of the study conducted by Claus et al. differs from that of Gail et al. in that Claus et al. intended to address the issue of risk calculation solely for a subset of women who are at potentially high risk for breast cancer, i.e., women with a family history of breast cancer. For these women, it appears that the number and the type of relatives affected with breast cancer as well as the ages at onset of any affected relative may be the most important risk factors, more so than risk factors such as age at first live birth or age at menopause that are used in the Gail model. Claus et al. found in their data that risk of individuals increased as "age at onset" of their affected relatives decreased [24]. On the other hand, Gail et al. did not find, in their data, that age at onset was helpful in the prediction of risk once the number of relatives affected was considered [22, 31].

Because the risk factors used in the Gail model are more consistent with those selected from other studies, the Gail model was able to be validated on other large databases. Validation studies [32, 33] have shown that the Gail model predicts risk most accurately in women who undergo yearly mammographic screening and overpredicts risk for women who do not undergo yearly mammographic screening. Another validation study, which involved 109,413 women from the Nurses' Health Study, showed that the correlation coefficient between observed risk from the database and predicted risk from the Gail model was 0.67 [33]. These validation studies demonstrated that, for accurate estimation, the Gail and Claus models should be applied only to a population similar to those from which the models were derived.

With the increasing awareness of breast cancer risk and the benefit of screening mammography, more women in all risk categories are seeking information regarding their individual breast cancer risk. The need exists for primary care clinicians to be able to assess an individual's risk of developing breast cancer and offer an appropriate surveillance program for each individual [34, 35]. Identification and close surveillance of women who are at high risk of developing breast cancer may provide an opportunity for early cancer detection.

Breast cancer risk assessment is an emerging service which includes determination of risk, recommendations for surveillance, and counseling for women at elevated risk. Currently, several prediction models based on large epidemiologic studies [11] have been developed to predict risk using known risk factors such as a woman's age, her family and personal histories of breast cancer, and gynecological information. Among them, the Gail model and the Claus model are the most commonly used for prediction of an individual's breast cancer risk [34]. These models are used by clinicians for counseling women who are seeking information regarding their individual breast cancer risk. The Gail model was used to identify women at high risk for the entry to the Tamoxifen Prevention Trial. Recently, Offit and Brown [11] reviewed four major models of risk prediction and provided a comparison of the different models. Since each of these models was derived with a different study design and used different factors to calculate risk, risk estimates for a given individual obtained from each of the models differed slightly. It was anticipated and confirmed that these models, which use a few selected risk factors, only predict risk accurately for the populations similar to those from which the models were developed [22, 24, 31, 32, 33, 36]. Clinicians have been instructed to select models carefully since each of these models was designed based on a particular population. Further, the risk predicted from these models must be justified according to clinical observations since information such as a positive result from a DNA test for the BRCA1/BRCA2-mutation supersedes routine projections from a model [34, 36]. Nevertheless, the models provide an epidemiologic basis for risk prediction and serve as guidelines for counseling patients until more refined predictions based on molecular characterization or other methods become available.

Over the past twenty years, the association of breast cancer risk with mammographic parenchymal patterns has been investigated. In 1976, Wolfe first described an association between risk for breast cancer and different mammographic patterns [37]. He described four patterns of breast parenchyma (N1, P1, P2, and DY) associated with different risk levels of developing breast cancer. An N1 (lowest risk) pattern indicates a breast in which the breast is composed entirely of fat tissue. P1 (high risk) and P2 (high risk) patterns refer to increasing ductal prominence (a P1 pattern consists of ducts occupying less than 25% of the breast and a P2 pattern consists of ducts occupying more than 25% of the breast). A DY pattern (highest risk) refers to a breast which is largely occupied by diffuse or nodular densities. Many investigators have used Wolfe patterns to classify the mammographic appearance of breast parenchyma for risk prediction [38]. Others have used qualitative or quantitative estimates of the proportion of the breast area (percent density) that mammographically appears dense to assess the associated breast cancer risk.

Since Wolfe's work, interest in the possible association of mammographic parenchymal patterns with breast cancer has varied [39-41]. Wolfe's initial reports were landmark studies in this field, however, the results provoked various criticisms, for example, possible bias in the results due to the "masking" effect. Studies showed that breast cancer was most easily detected by mammography in fatty breasts and was most difficult to detect in breasts with dense parenchyma, thus there were more cancers missed by mammography in women with dense breasts [42]. The hypothesis of the "masking effect" [39] said that the observed greater risk of breast cancer in women with dense breasts was due to the fact that these missed cancers in the dense breast at the initial classification declared themselves on subsequent follow-up.

Several groups [28, 43] have conducted experiments to examine the masking hypothesis. Whitehead et al. [43] examined the masking hypothesis by using data from the Breast Cancer Detection and Demonstration Project (BCDDP). They found that the masking of cancer did occur in breasts with dense parenchyma; however, their results showed that the effect of the masking on estimation of breast cancer risk was small. They concluded that women with dense breasts have two disadvantages: 1) they were at increased risk of developing breast cancer, and 2) cancers occurring in dense breast parenchyma were more difficult to detect.

During the time of this controversy, many investigators studied the relationship between the mammographic patterns and breast cancer risk using the Wolfe method or percent density methods. Considerable variations were observed in reported results. In 1992, Warner et al. [38] carried out a meta-analysis using 35 publications to examine the effect of different methods on the assessment of breast cancer risk. They grouped the studies according to their designs and methods used, and determined the magnitude of the risk of breast cancer associated with mammographic density for the studies in each group. They found that the estimated relative risk of developing breast cancer depended on the methods that were used to classify mammographic patterns and ranged from 0.53 to 5.19. Based on the meta-analysis, they concluded that women with dense breasts have an increased risk of breast cancer relative to those with fatty breasts.

While visual assessment of mammographic patterns has remained controversial due to the subjective nature of human assessment [44], computer vision methods can yield objective measures of breast density patterns. Computerized techniques have been investigated to quantitatively evaluate mammographic parenchyma and identify women that are at risk of developing breast cancer. Computerized density analysis of mammographic images has been investigated by various investigators including Magnin et al. [45], Caldwell et al. [46], Taylor et al. [47], Tahoces et al. [48], and Byng et al. [49, 50].

Magnin et al. [45] tried to classify mammograms into four categories (Wolfe patterns) using texture parameters extracted from co-occurrence matrices, the spatial gray level dependence method (SGLDM), and the gray level difference method (GLDM). They claimed that their result was inconclusive because a limited number of cases (27 mammograms) were used and the quality of the images used in the study was poor [37]. Caldwell et al. [46] used fractal dimension analysis to classify mammograms into the four patterns described by Wolfe, yielding 84% agreement with that of radiologists. Tahoces et al. [48] investigated the ability of linear discriminant analysis to quantify Wolfe patterns by merging texture measures obtained from Fourier transform method, local contrast analysis, and gray-level distribution. Their results showed that agreement (22%-77%) among radiologists and the computer classification varied depending on the Wolfe patterns. Taylor et al. [47] used a local skewness measure to separate fatty and dense breasts, yielding 85% classification accuracy for 106 mammograms. Byng et al. [49, 51] investigated a semi-automated interactive thresholding technique based on visual assessment and computerized texture analysis (a local skewness measure and fractal dimension analysis) to quantify the percent density of breasts. Their results showed that computerized assessment of mammographic density using the texture measures (R=−0.60) correlated well with the visual assessment (subjective classification) of the projected area of mammographically dense tissue. Furthermore, they showed that increased mammographic density was associated with an increased relative risk by a factor of 2 to 4. Their results also showed that the relative risk estimates obtained using the two computer-extracted texture measures were not as strong as those from their subjective mammographic classification method.

A conventional method for discriminating a high risk group of women from a low risk group is illustrated in FIGS. 1 and 2. FIG. 1 shows an original breast image 1 which is taken for example with an x-ray device. From this medical image, a region of interest 3 is selected for a detailed analysis. The selected region of interest has a size of 256 by 256 pixels. FIG. 2 shows a diagram in which the medical image data is acquired in step 1. In step 3, the medical image data is digitized. Further, in step 5, the region of interest is selected for analysis. In step 7, the region of interest selected in step 5 is computer analyzed and various computer-extracted texture features are obtained. In step 9 linear discriminant analysis is applied to the computer-extracted features and a marker is calculated based on these features. Based on this marker, in step 11, a group of women are discriminated in high and low risk groups. However, the conventional methods known do not produce an accurate discrimination for the two groups.

Therefore, development of a better and more accurate computerized method to automatically extract features that characterize mammographic parenchymal patterns and relate to breast cancer risk would benefit women seeking information regarding their individual breast cancer risk.

SUMMARY OF THE INVENTION

Accordingly, an object of this invention is to provide a method and system for obtaining a fractal characteristic based on computerized fractal-based analysis of a structure as presented on a medical image.

Another object of this invention is to provide a method and system for the computerized fractal-based analysis of parenchymal structure as presented on a medical image and relate the analysis to risk of breast cancer.

Another object of this invention is to provide a method and system for extracting information from fractal-based texture analyses.

These and other objects are achieved according to the invention by providing a new and improved method and system for the analysis of structure as presented as texture on a medical image. Specific applications are given for the analysis of regions within the mammographic breast.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
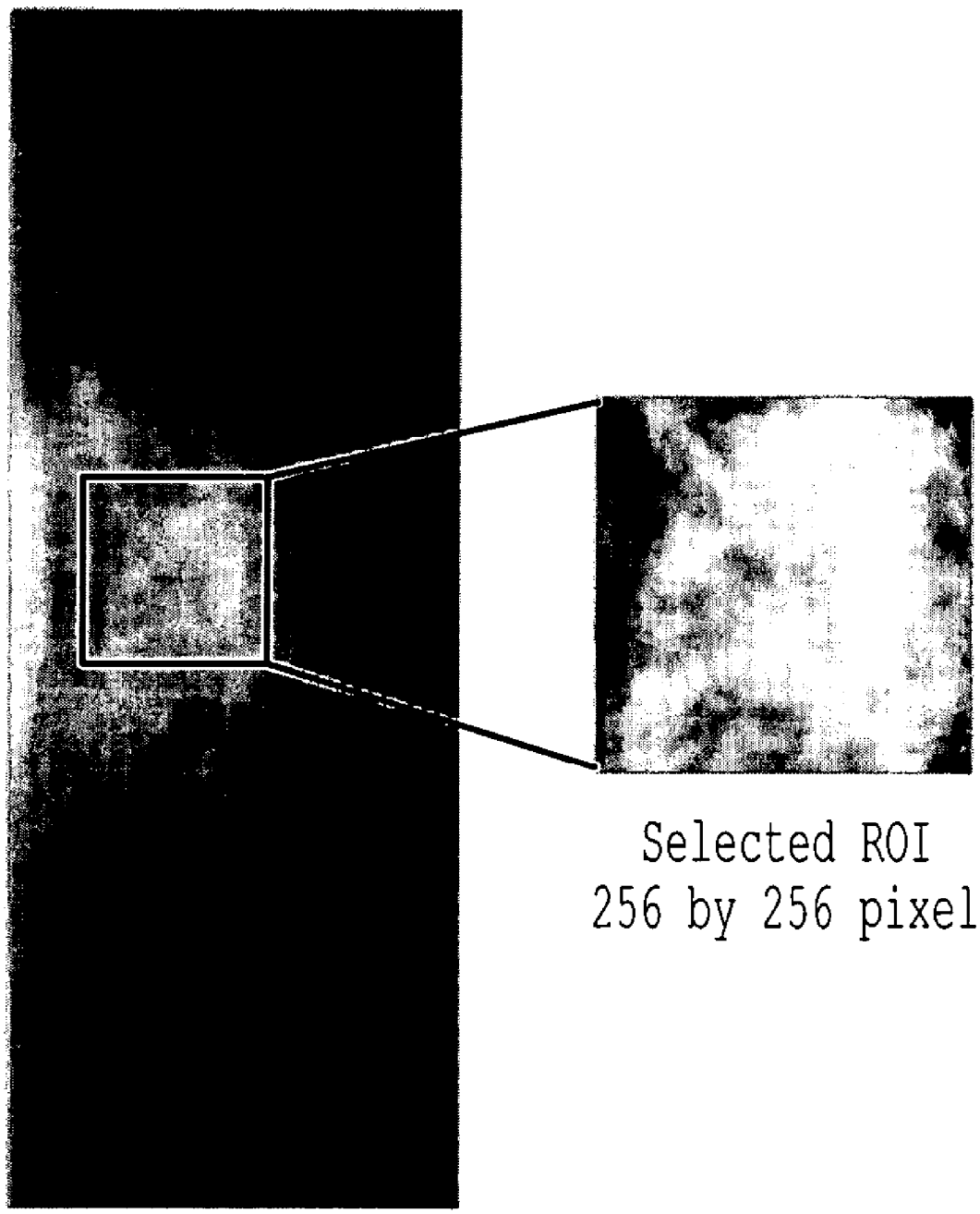
FIG. 1 is an illustration of a medical image of a breast and a region of interest of the medical image.
Figure 2:
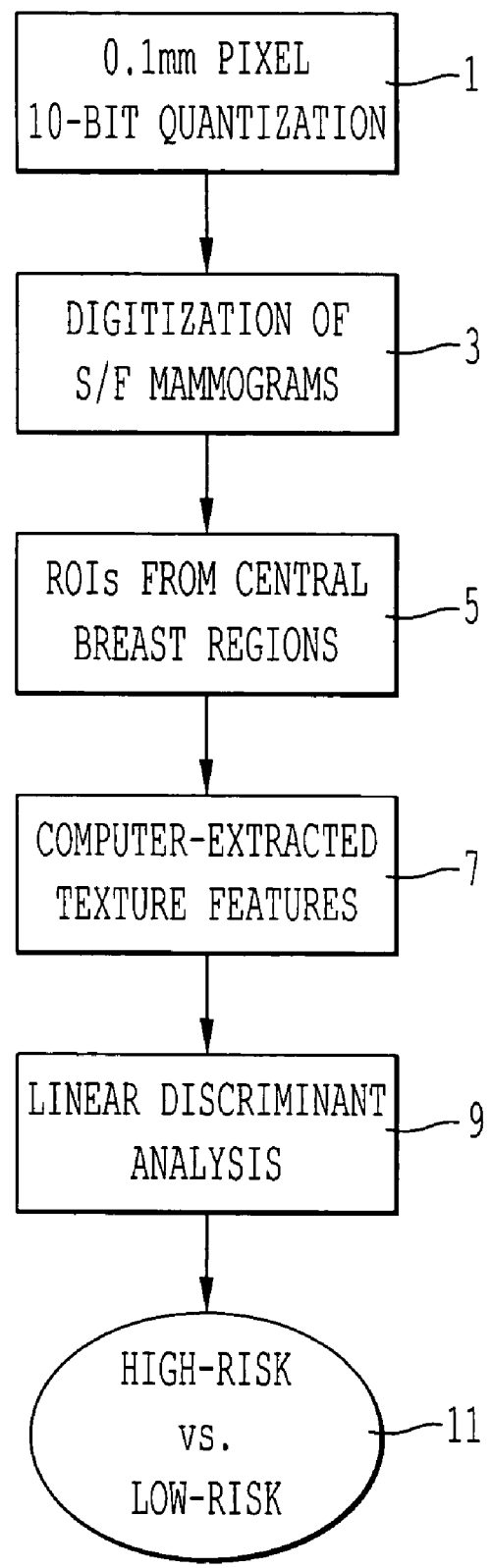
FIG. 2 is a schematic diagram illustrating a conventional method for analysis of a structure as presented on the medical image.
Figure 3:
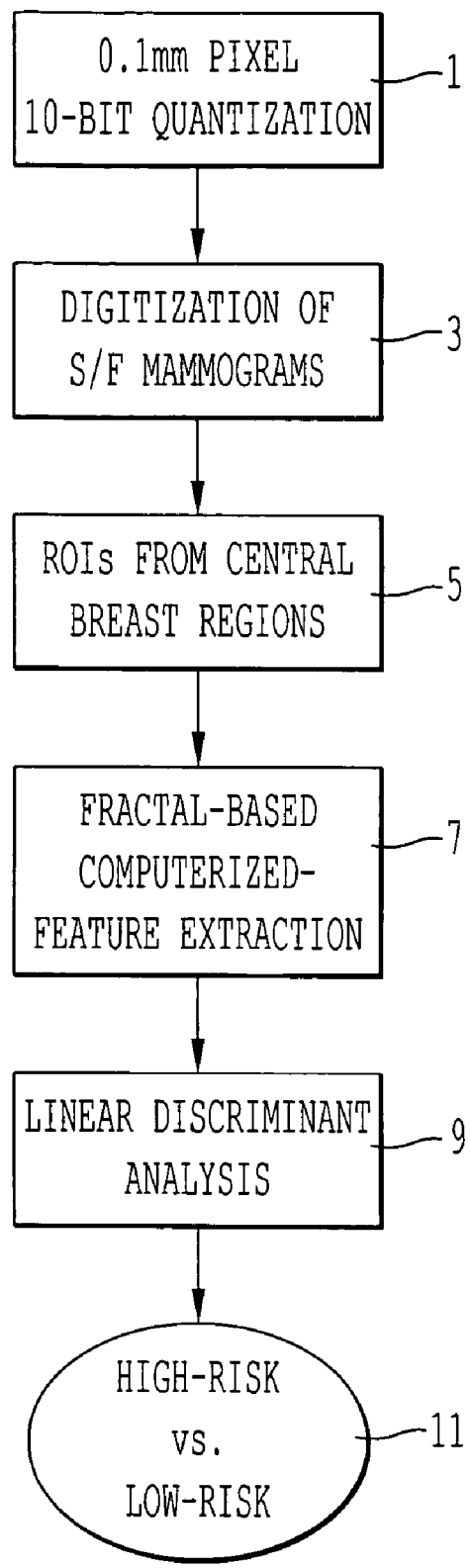
FIG. 3 is a schematic diagram illustrating a novel method for analysis of the structure presented on the medical image according with the present invention.

Referring now to the drawings, and more particularly to FIG. 3 thereof, a schematic diagram of the fractal-based analysis of a texture of a region of interest as presented on a medical image is shown. In this embodiment, the aim is to extract the multi-fractal characteristics of the structure (from the parenchymal pattern) using computer analysis of fractal data. Step 1 in FIG. 3 shows an initial acquisition of a medical image of a breast from a film or any other means used for obtaining radiographic image data of the breast. A digitization of the medical image is accomplished in step 3. Further, in step 5, a region of interest is selected for a further analysis. In step 7, the region of interest selected in step 5 is computer analyzed and fractal-based computer-extracted texture features are obtained. In step 9 a linear discriminant analysis is applied to the fractal-based computer-extracted features and a marker is calculated based on these features. Further, based on this marker, in step 11, a group of women are discriminated in high and low risk groups. The robustness of the results produced by this novel method was tested against a database.

The database used for running and evaluating the method of this embodiment contains 30 BRCA1 and BRCA2 gene-mutation carriers and 60 low-risk women which were randomly selected and age-matched at 5-year intervals with these gene carriers [52]. Mammograms were digitized in step 3 at 0.1-mm pixel size and 10-bit gray level. Regions of interest (ROIs), 256 by 256 pixels in size [52], were manually selected in step 1 of FIG. 3 from a central breast region immediately behind the nipple [53].

Four approaches based on fractal analysis were performed. The first method used the conventional box-counting technique [54], $$A(\varepsilon) = \sum_{x,y} \varepsilon^2 + \sum_{x,y} \varepsilon(|i_\varepsilon(x,y) - i_\varepsilon(x,y+1)| + |i_\varepsilon(x,y) - i_\varepsilon(x+1,y)|), \quad (1)$$

where $A(\varepsilon)$ is the surface area of the ROI at effective pixel size $\varepsilon$ and $i_\varepsilon(x,y)$ is the gray level at location $(x,y)$ in the digitized image data. $A(\varepsilon)$ is calculated using equation (1) for various pixel sizes $\varepsilon$. For a two-dimensional mammogram, the fractal dimension is defined by equation (2), $$D_{BC} = 2 - \lim_{\varepsilon \to 0} \frac{\log[A(\varepsilon)]}{\log[\varepsilon]}. \quad (2)$$

The second method used a modified box-counting technique. Linear discriminant analysis (LDA) was applied on surface areas $A(\varepsilon)$ calculated at multiple pixel sizes $\varepsilon$. The output from LDA yielded a new class of radiographic markers that are similar to the fractal dimension extracted using equation (2).

Figure 4:
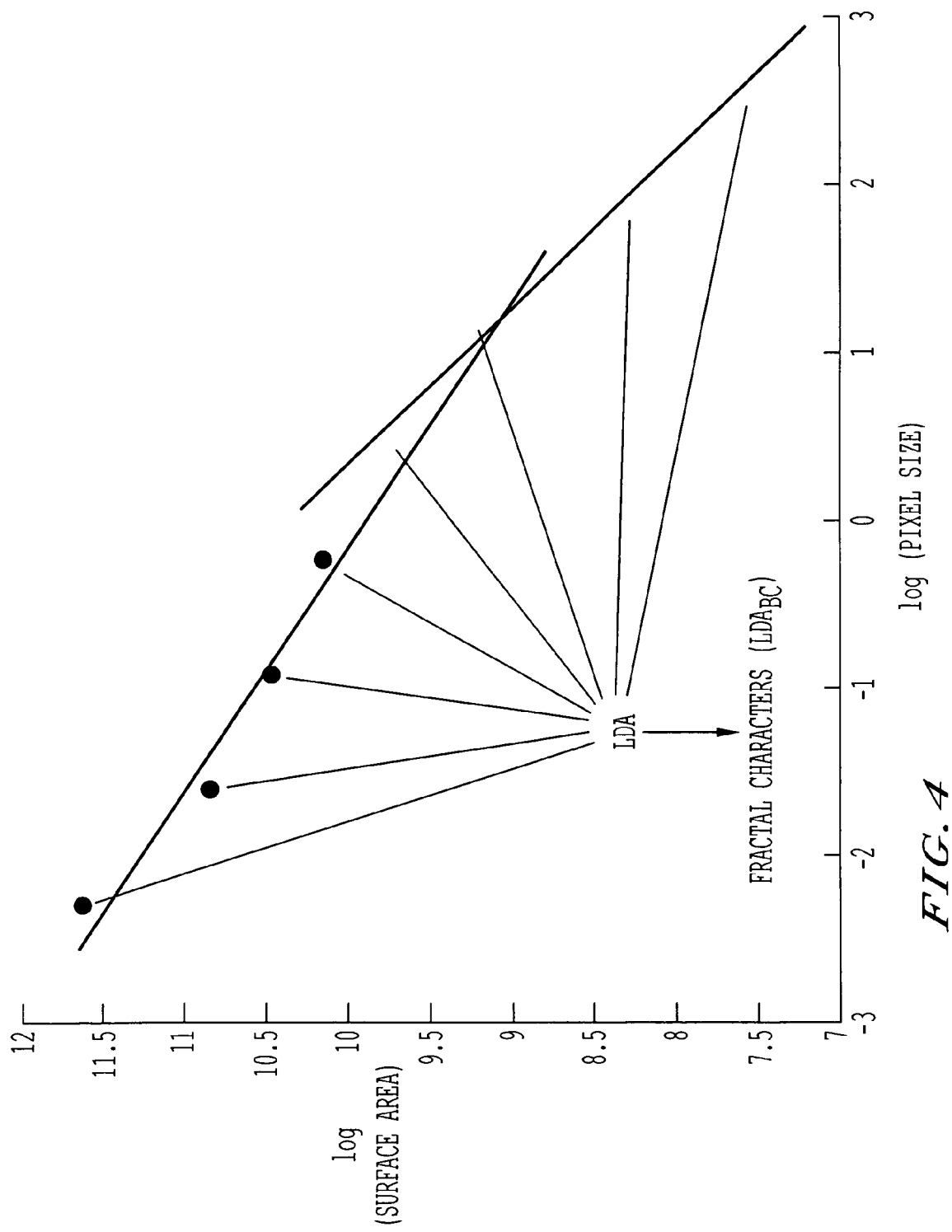
FIG. 4 is a graph showing a relationship between a log area and a log of a relative length from a surface area fractal analysis of the region of interest.

FIG. 4 shows the points used to calculate the fractal dimension $BC_{LDA}$ and the fractal characteristic based on the second method.

Figure 5:
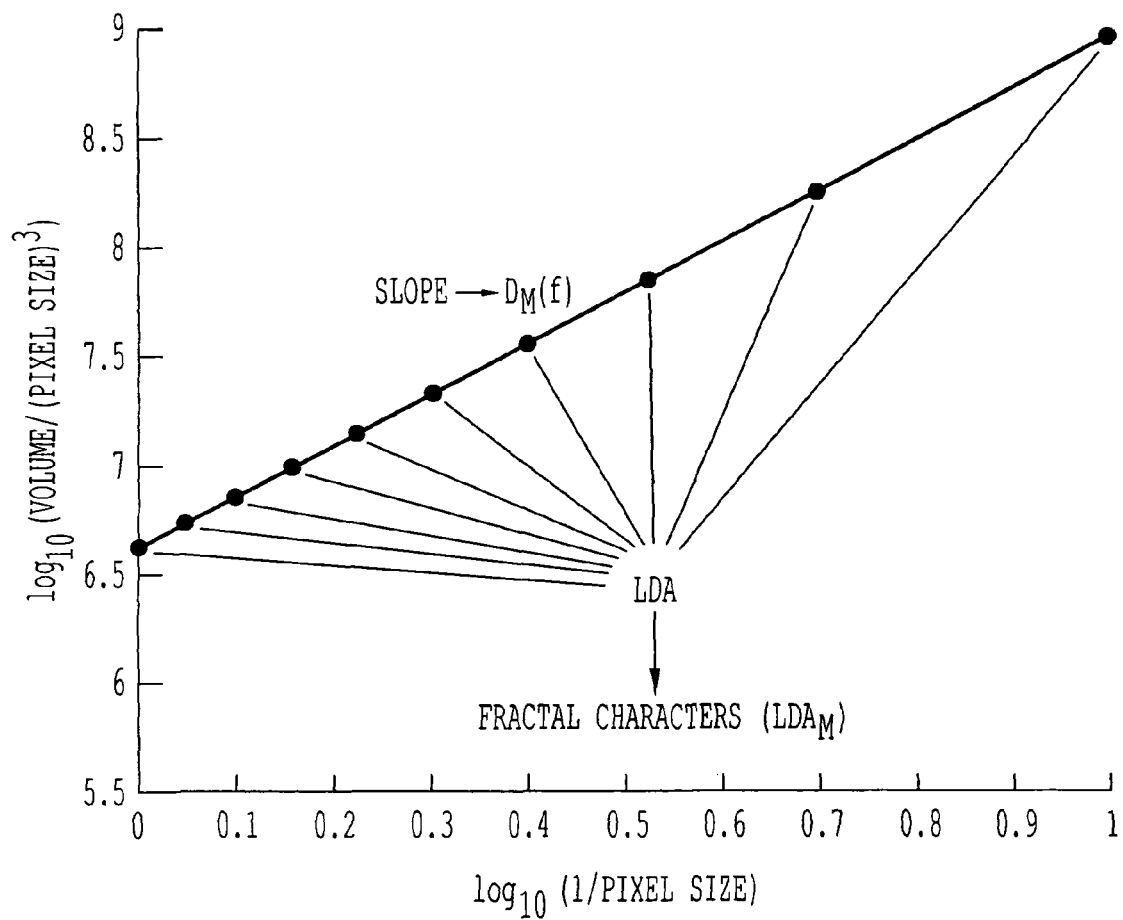
FIG. 5 is a graph showing a relationship between the normalized volume and a scale from a fractal analysis of the region of interest.

The third method used the global Minkowski dimension, $D_M(f)$, calculated using $$D_M[f] = \lim_{\varepsilon \to 0} \frac{\log[V_g(\varepsilon)/\varepsilon^3]}{\log(1/\varepsilon)}, \quad (3)$$

where for a structuring element g at scale $\varepsilon$, $V_g(\varepsilon)$ is the "volume" between two processed versions of f obtained using morphological operators. The volume $V_g(\varepsilon)$ is computed by $$V_g(\varepsilon) = \sum_{m=0}^{64} \sum_{n=0}^{64} \{(f \oplus \varepsilon g) - (f \otimes \varepsilon g)\}, \quad (4)$$

where $(f \oplus \varepsilon g)$ and $(f \hat{\times} \varepsilon g)$ are the dilated version and the eroded version, respectively, of the image obtained using the structuring element g at scale $\varepsilon$. Note that $V_g(\varepsilon)$ is the volume arising from the difference between the dilated and eroded surfaces. Finding the slope of the least-square fitted line between $\log[V_g(\varepsilon)/\varepsilon^3]$ and $\log(1/\varepsilon)$ gives the estimated fractal dimension as shown in FIG. 5. A squared structuring element of 3×3 pixels was used.

The fourth method used a modified Minkowski dimension that is similar to the second method. LDA was applied on volume $V_g(\varepsilon)$ calculated at multiple scales. The output from LDA yielded a new class of radiographic markers that are similar to the fractal dimension extracted using equation (3).

For comparing the accuracy of the computerized radiographic markers discussed above as indicators of risk, receiver operating characteristics (ROC) analysis [55] was used to evaluate the performance of the methods in the task of distinguishing between the BRCA1/BRCA2 gene-mutation carriers and low-risk group. The leave-one-out method (round-robin method) [56], was used in the performance evaluation for the LDA approaches.

Note that with both of these fractal based techniques, one is required to determine a slope as in FIG. 5 or multiple slopes as in FIG. 4, if the texture is multi-fractal in nature. This may be difficult due to the number of limited data points used in determining the slope (see FIGS. 4 and 5). However, the method presented in this embodiment incorporates a classifier (such as linear discriminant analysis or an artificial neural network) to determine the fractal nature of the texture and relate it to breast cancer risk, which make the results more accurate and reliable.

The calculated fractal dimension shown in FIG. 4 is based on the box-counting model, which uses the slope of the regression line between the logarithm of surface areas, $\log[A(\varepsilon)]$, and the logarithm of various pixel sizes, $\log[\varepsilon]$, should yield a linear line for a fractal object. Plots of $\log[A(\varepsilon)]$ versus $\log[\varepsilon]$ in FIG. 4 show two linear components—a high frequency component and a low frequency component suggesting a multi-fractal phenomenon for the radiographic images. The fractal dimensions, $D_{BC}$, were calculated using all data points, the high frequency components only and the low frequency components only. The results are shown in Table 2. Likewise, results are shown in Table 2 for the global Minkowski dimension and the LDA methods for both box-counting and Minkowski methods. The index $_{0.90}A^T_Z$ is used to indicate the performance above 90% sensitivity [57].

TABLE 2

Performance in differentiating between the two groups with fractal dimensions extracted using the four approaches. ROC results are from the round-robin method for the LDA approaches.

| Feature | $A_Z$ | | $0.90A^T_Z$ | |
| --- | --- | --- | --- | --- |
| $D_{BC}$ (All data points) | 0.77 | 0.05 | 0.341 | 0.10 |
| $D_{BC}$ (High frequency component) | 0.86 | 0.04 | 0.31 | 0.15 |
| $D_{BC}$ (Low frequency component) | 0.58 | 0.06 | 0.14 | 0.06 |
| $LDA_{BC}$ (All data points) | 0.89 | 0.04 | 0.49 | 0.15 |
| $LDA_{BC}$ (High frequency component) | 0.91 | 0.03 | 0.56 | 0.14 |
| $LDA_{BC}$ (Low frequency component) | 0.55 | 0.06 | 0.10 | 0.05 |
| DM[f] | 0.84 | 0.05 | 0.26 | 0.13 |
| $LDA_M$ | 0.91 | 0.03 | 0.55 | 0.14 |

A multi-fractal phenomenon in the parenchymal texture was observed using the method of this embodiment on normal digitized screen/film mammograms. These results extend prior application of conventional box-counting and Minkowski techniques by incorporating linear discriminant analysis to assess the multi-fractal characteristics. The use of fractal analysis to characterize mammographic parenchymal patterns yield radiographic markers for assessing breast cancer risk in patients.

As disclosed in cross-referenced pending patent application Ser. No. 09/773,636, FIG. 9 of that patent application is a schematic illustration of a general purpose computer 900 which can be programmed according to the teachings of the present invention. In FIG. 9 of the cross-referenced application Ser. No. 09/773,636, the computer 900 can be used to implement the processes of the present invention, wherein the computer includes, for example, a display device 902 (e.g., a touch screen monitor with a touch-screen interface, etc.), a keyboard 904, a pointing device 906, a mouse pad or digitizing pad 908, a hard disk 910, or other fixed, high density media drives, connected using an appropriate device bus (e.g., a SCSI bus, an Enhanced IDE bus, an Ultra DMA bus, a PCI bus, etc.), a floppy drive 912, a tape or CD ROM drive 914 with tape or CD media 916, or other removable media devices, such as magneto-optical media, etc., and a mother board 918. The mother board 918 includes, for example, a processor 920, a RAM 922, and a ROM 924 (e.g., DRAM, ROM, EPROM, EEPROM, SRAM, SDRAM, and Flash RAM, etc.), I/O ports 926 which may be used to couple to an image acquisition device and optional special purpose logic devices (e.g., ASICs, etc.) or configurable logic devices (e.g., GAL and re-programmable FPGA) 928 for performing specialized hardware/software functions, such as sound processing, image processing, signal processing, neural network processing, automated classification, etc., a microphone 930, and a speaker or speakers 932.

As stated above, the system of the present invention includes at least one computer readable medium. Examples of computer readable media are compact discs, hard disks, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer and for enabling the computer to interact with a human user. Such software may include, but is not limited to, device drivers, operating systems and user applications, such as development tools. Such computer readable media further includes the computer program product of the present invention for performing any of the processes according to the present invention, described above. The computer code devices of the present invention can be any interpreted or executable code mechanism, including but not limited to scripts, interpreters, dynamic link libraries, Java classes, and complete executable programs, etc.

The programming of general purpose computer 900 (disclosed in cross-referenced pending patent application Ser. No. 09/773,636) may include a software module for digitizing and storing images obtained from film or an image acquisition device. Alternatively, the present invention can also be implemented to process digital data derived from images obtained by other means, such as a picture archive communication system (PACS). In other words, the digital images being processed may be in existence in digital form and need not be converted to digital form in practicing the invention.

Accordingly, the mechanisms and processes set forth in the present description may be implemented using a conventional general purpose microprocessor or computer programmed according to the teachings in the present specification, as will be appreciated by those skilled in the relevant art(s). Appropriate software coding can readily be prepared by skilled programmers based on the teachings of the present disclosure, as will also be apparent to those skilled in the relevant art(s). However, as will be readily apparent to those skilled in the art, the present invention also may be implemented by the preparation of application-specific integrated circuits or by interconnecting an appropriate network of conventional component circuits.

The present invention thus also includes a computer-based product which may be hosted on a storage medium and include instructions which can be used to program a general purpose microprocessor or computer to perform processes in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method implemented by a computer programmed as an image processing device that analyzes a mammogram in digital form of a breast of a patient, comprising:
   extracting from a selected region of interest in the mammogram, plural surface area values or plural volume values calculated at corresponding plural scales associated with a texture of a parenchyma of the breast;
   applying, by the image processing device, said plural surface area values or said plural volume values directly as inputs to at least one of a linear discriminant classifier and an artificial neural network classifier; and
   generating a risk marker indicative of a breast disease risk for said patient based on an output of the at least one of a linear discriminant classifier and an artificial neural network classifier.

2. The method according to claim 1, wherein the extracting step comprises:
   extracting the plural surface area values from an area of the region of interest of the mammogram based on a box-counting method.

3. The method according to claim 1, wherein the extracting step comprises:
   extracting the plural volume values from a volume of the region of interest of the mammogram based on a general Minkowski model.

4. The method according to claim 1, wherein the applying step comprises:
   applying the plural surface area values or the plural volume values to a linear discriminant analysis classifier.

5. The method according to claim 1, wherein the applying step comprises:
   applying the plural surface area values or the plural volume values to an artificial neural network classifier.

6. The method according to claim 1, wherein the extracting step comprises:
   extracting from the mammogram a multi-fractal characteristic associated with the texture of the parenchyma of the breast.

7. A system for computerized analysis of a mammogram in digital form of a breast of a patient, comprising:
   a memory storing the mammogram in digital form;
   a feature extraction mechanism that extracts, from a selected region of interest in the mammogram, plural surface area values or plural volume values calculated at corresponding plural scales associated with a texture of a parenchyma of the breast;

a classifier mechanism including at least one of a linear discriminant classifier and an artificial neural network to which the plural surface area values or said plural volume values are directly applied as inputs; and a risk marker generator that generates a risk marker indicative of a breast disease risk for said patient based on an output of the classifier mechanism.

8. The system according to claim 7, wherein the feature extraction mechanism extracts the plural surface area values from an area of the region of interest of the mammogram based on a box-counting method.

9. The system according to claim 7, wherein the feature extraction mechanism extracts the plural volume values from a volume of the region of interest of the mammogram based on a general Minkowski model.

10. The system according to claim 7, wherein the classifier mechanism comprises a linear discriminant analysis classifier.

11. The system according to claim 7, wherein the classifier mechanism comprises an artificial neural network classifier.

12. The system according to claim 7, wherein the feature extraction mechanism extracts from the mammogram a multi-fractal characteristic associated with the texture of the parenchyma of the breast.

13. A non-transitory computer readable medium storing instructions for execution on a computer system, which when executed by the computer system, causes the computer system to perform a method for a computerized analysis of a mammogram in digital form of a breast of a patient, comprising the steps of:

extracting from a selected region of interest in the mammogram, plural surface area values or plural volume values calculated at corresponding plural scales associated with a texture of a parenchyma of the breast;

applying said plural surface area value or said plural volume values directly as inputs to at least one of a linear discriminant classifier and an artificial neural network classifier; and generating a risk marker indicative of a breast disease risk for said patient based on an output of the at least one of a linear discriminant classifier and an artificial neural network classifier.

14. The computer readable medium according to claim 13, wherein the extracting step comprises:

extracting the plural surface area values from an area of the region of interest of the mammogram based on a box-counting method.

15. The computer readable medium according to claim 13, wherein the extracting step comprises:

extracting the plural volume values from a volume of the region of interest of the mammogram based on a general Minkowski model.

16. The computer readable medium according to claim 13, wherein the applying step comprises:

applying the plural surface area values or the plural volume values to a linear discriminant analysis classifier.

17. The computer readable medium according to claim 13, wherein the applying step comprises:

applying the plural surface area values or the plural volume values to an artificial neural network classifier.

18. The computer readable medium according to claim 13, wherein the extracting step comprises:

extracting from the mammogram a multi-fractal characteristic associated with the texture of the parenchyma of the breast.

\* \* \* \* \*